UNITED STATES PATENT OFFICE.

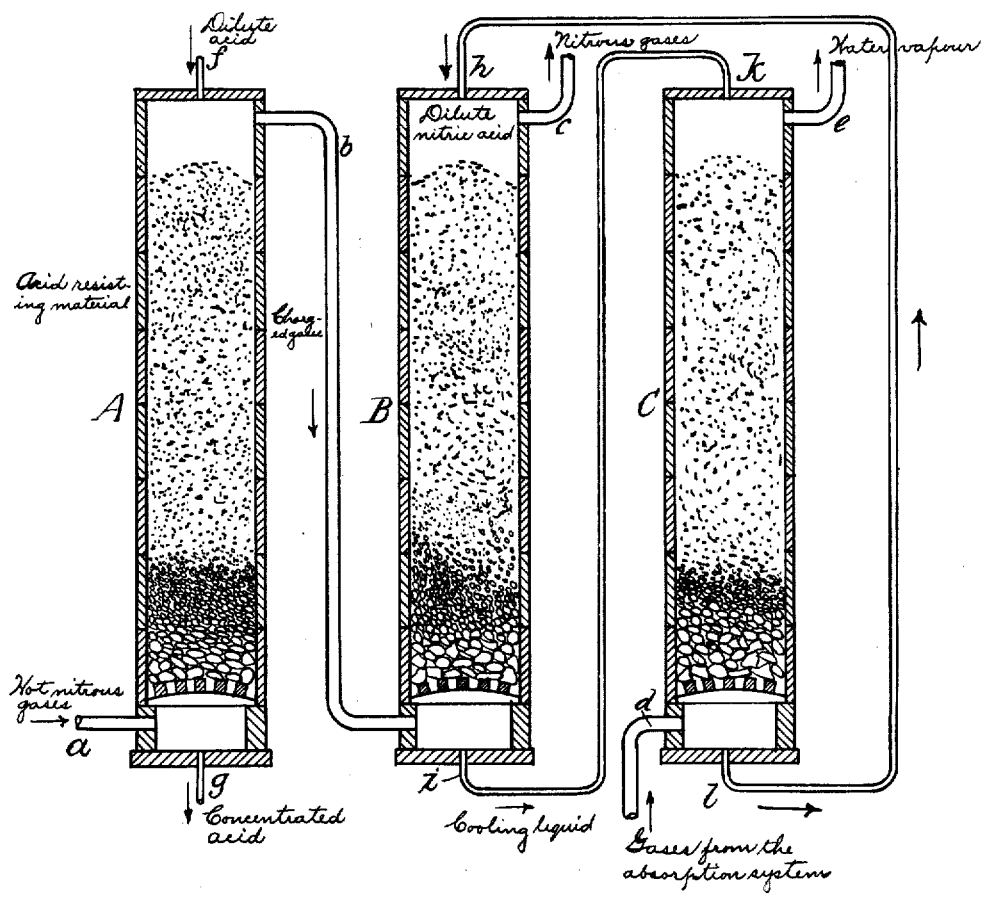

ANTON CHRISTIAN BOHRE, DECEASED, LATE OF CHRISTIANIA, NORWAY, BY KATHARINA CHARLOTTE BOHRE, EXECUTRIX, OF BERGEN, NORWAY.

PROCESS OF CONCENTRATING NITRIC AND SULFURIC ACID.

1,338,418.  Specification of Letters Patent.  Patented Apr. 27, 1920.

Application filed July 28, 1919. Serial No. 313,849.

*To all whom it may concern:*

Be it known that I, KATHARINA CHARLOTTE BOHRE, a subject of the King of Norway, of Bergen, Norway, executrix of the estate of ANTON CHRISTIAN BOHRE, late of Christiania, Norway, do declare that he, the said ANTON CHRISTIAN BOHRE, has invented certain new and useful Improvements in Processes of Concentrating Nitric and Sulfuric Acid; and I do further declare the following to be a full, clear, and exact description of the invention, such as will enable others skilled in the art to which it appertains to make and use the same.

This invention relates to the concentration of nitric and sulfuric acid by the action of hot nitrous gases.

As known several attempts have been made to effect the concentration of dilute nitric acid and of sulfuric acid containing some nitric acid by means of hot nitrous gases. The attempts hitherto made to carry this process into effect on a commercial scale have not however met with success because of the difficulties involved by the action of the treated substances upon the materials as well as by the large dimensions necessary to obtain the required cooling surface.

According to the present invention it is now possible to effect the concentration of dilute acids by the action of hot nitrous gases in such a manner as to avoid the difficulties hitherto met with. This is attained by a process, which consists in passing the hot nitrous gases in direct contact with the acid to be concentrated, condensing the resulting vapors by passing the mixture of gases and vapors in contact with a cooling liquid, and thereupon lowering the temperature of the so used cooling liquid so as to prepare it for repeated use as a cooling liquid by passing a current of a gas through the same. In this process the concentration of the acid, the condensation of the resulting vapors and the recooling of the liquid employed to effect the condensation take place in separate scrubbers or irrigation towers, the gases and liquids being preferably passed in counter current to each other.

The condensation apparatus is then charged with water or dilute acid, which acts as a cooling liquid. To recool this condensation liquid after use air or other gas is suitably passed in such quantity through the liquid, that the water hereby evaporated absorbs a quantity of heat corresponding to that evolved in the condensation apparatus. The liquid hereby recooled can then be returned to the condensation apparatus. In the course of this cooling process a concentration of the dilute acid condensed in the condensation apparatus also takes place.

The process may for instance be carried into effect in the following manner, reference being had to the accompanying drawing, in which a concentration plant is diagrammatically illustrated. A tower A filled with acid resisting material, is charged at the top at *f* with dilute acid (viz. nitric acid or sulfuric acid containing some nitric acid). Hot nitrous gases are introduced at *a*. The gases in passing through the tower take up water vapor and also some acid vapors from the acid. At the bottom the acid is discharged at *g* as concentrated acid, (viz: nitric acid of about 65 per cent. or sulfuric acid of about 95 per cent.). The gases charged with vapors of water and of acid are led through the pipe *b* to the bottom of a tower B charged with dilute nitric acid. This acid is supplied to the top of the tower at *h* at a temperature of about 20–30° C. In this tower practically the entire acid vapor leaving the tower A is condensed and also so much of the water, that the escaping gases are only saturated with water vapor at a temperature of 20–30°. The nitrous gases leaving this tower at *c* can now safely be introduced into the absorption system for the absorption of the nitrogen oxids contained therein.

The heat of condensation evolved in the tower B, which corresponds to the quantity of heat, which the gases have given off in the tower A, raises the temperature of the cooling liquid to for instance 50–60° (depending of course upon the quantity of liquid circulating through the tower). This hot cooling liquid is now led through the pipe *i* to a tower C of a similar construction as the towers A and B. Through this tower is blown a current of air or other gases for instance the gases from the absorption system for the nitrous gases (as employed in the manufacture of nitrogen compounds by the combustion of air nitrogen), This gas enters at $d$ and escapes at $e$. In many instances the last acid tower in the absorption system can be used with advantage as the tower C. In contact with the hot liquid the air or the gases are heated and take up moisture, whereby heat is again absorbed. The current of gas is so controlled that in the tower C so much water is evaporated that the heat thereby absorbed corresponds to the heat evolved in B. The temperature of the liquid flowing through the tower C is thereby lowered to such a degree that the liquid can again be used in the tower B. In order to maintain the liquid circulating through B and C at a constant temperature a proportion of the liquid is removed, a corresponding quantity of water or of a more dilute acid being at the same time supplied. The gases escaping from C contain only water vapor and can be let out directly at $e$ into the open air.

The described method has the advantage of allowing the concentration to be effected in a very simple and reliable apparatus, in which a very good concentration and cooling action is obtained owing to the direct contact of the liquids to be concentrated and condensed with the gases.

Claims:
1. Process for the concentration of nitric or sulfuric acid comprising the steps of passing hot nitrous gases in contact with the acid to be concentrated, condensing the resulting vapors by passing the mixture of gases and vapors in contact with a cooling liquid, and thereupon lowering the temperature of the so used cooling liquid by passing a current of gas through the same so as to prepare it for further use as a cooling liquid.

2. Process as defined in claim 1 in which the residual gas obtained when the nitrous gases from an air nitrogen combustion plant have passed through an absorption system is used to effect the recooling of the cooling liquid.

In testimony that I claim the foregoing as his invention, I have signed my name in presence of two subscribing witnesses.

KATHARINA CHARLOTTE BOHRE,
*Executrix of the estate of Anton Christian Bohre, deceased.*

Witnesses:
 ODD BJACOBSEY,
 JOHN KAMMER.

It is hereby certified that Letters Patent No. 1,338,418, granted April 27, 1920, upon the application of Katharina Charlotte Bohre, of Bergen, Norway, as executrix of Anton Christian Bohre, deceased, for an improvement in "Processes of Concentrating Nitric and Sulfuric Acid," were erroneously issued to said Katharina Charlotte Bohre, executrix, as owner of said invention, whereas said Letters Patent should have been issued to *Norsk Hydro-Elektrisk Kvaelstofaktieselskab, of Christiania, Norway*, as assignee of the entire interest in said invention as shown by the record of assignments in this Office; and that the said Letters Patent should be read with this correction therein that the same may conform to the record of the case in the Patent Office.

Signed and sealed this 28th day of September, A. D., 1920.

[SEAL.]

M. H. COULSTON,

*Acting Commissioner of Patents.*

Cl. 23—1.